(12) United States Patent
Tozaki et al.

(10) Patent No.: US 6,741,797 B2
(45) Date of Patent: *May 25, 2004

(54) INFORMATION RECORD MEDIUM, APPARATUS FOR RECORDING THE SAME AND APPARATUS FOR REPRODUCING THE SAME

(75) Inventors: Akihiro Tozaki, Saitama-ken (JP);
Tokihiro Takahashi, Saitama-ken (JP);
Hidehiro Ishii, Saitama-ken (JP);
Junichi Yoshio, Saitama-ken (JP);
Hiroshi Nakamura, Saitama-ken (JP);
Takao Sawabe, Tokyo-to (JP);
Yoshiaki Moriyama, Saitama-ken (JP);
Kaoru Yamamoto, Saitama-ken (JP)

(73) Assignee: Pioneer Electronic Corporation, Tokyo-To (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/822,259

(22) Filed: Apr. 2, 2001

(65) Prior Publication Data

US 2001/0014205 A1 Aug. 16, 2001

Related U.S. Application Data

(63) Continuation of application No. 08/806,458, filed on Feb. 26, 1997, now Pat. No. 6,236,804.

(30) Foreign Application Priority Data

Feb. 28, 1996 (JP) .................................. 8-41943

(51) Int. Cl.$^7$ ................................. H04N 5/91
(52) U.S. Cl. ........................................ 386/95; 386/125
(58) Field of Search ........................... 386/46, 95, 111, 386/125, 126, 96, 59.25; 369/59.25

(56) References Cited

U.S. PATENT DOCUMENTS

| | | | |
|---|---|---|---|
| 5,469,370 A | 11/1995 | Ostrover et al. | ........ 364/514 R |
| 5,526,339 A | 6/1996 | Shimada | ...................... 386/82 |
| 5,712,838 A | 1/1998 | Inazawa et al. | ................ 369/59 |
| 5,734,787 A | * 3/1998 | Yonemitsu et al. | ......... 386/126 |
| 5,870,523 A | 2/1999 | Kikuchi et al. | ................ 386/95 |
| 5,987,417 A | * 11/1999 | Heo et al. | ...................... 386/96 |
| 6,072,759 A | * 6/2000 | Maeda et al. | ............ 369/59.25 |
| 6,236,804 B1 | * 5/2001 | Tozaki et al. | .................. 386/95 |

* cited by examiner

Primary Examiner—Huy Nguyen
(74) Attorney, Agent, or Firm—Morgan, Lewis & Bockius LLP

(57) ABSTRACT

An information record medium (1: DVD) has a record track recorded with record information to be reproduced by an information reproducing apparatus (S2). The information reproducing apparatus is provided with a read device (80), and performs a reproduction while moving the read device along the record track at a predetermined reading linear velocity, the record information is divided into a plurality of first data groups (30: VOBU), each of which is a unit able to be accessed by the information reproducing apparatus, recorded on the record track. Lowest reading rate information (212) indicates a minimum requirement of a reading rate for the information reproducing apparatus to reproduce a reproduction unit, which comprises at least one of the first data groups and which is to be reproduced by the information reproducing apparatus such that a sequential logical meaning of the reproduction unit is continuous. The lowest reading rate information is recorded on the record track at one portion (LI, 11, 41) different from another portion where the record information is recorded.

41 Claims, 14 Drawing Sheets

LOGICAL STRUCTRE OF RECORD INFORMATION
(LOGICAL FORMAT)

STRUCTURE OF INTERLEAVED UNIT

IU : INTERLEAVED UNIT

FIG. 6

PHYSICAL FORMAT INFORMATION 202

| BYTE POSITION | CONTENT | NUMBER OF BYTES |
|---|---|---|
| 1 | BOOK TYPE AND VERSION | 1 |
| 2 | DISK SIZE AND LOWEST READING RATE | 1 |
| 3 | DISK STRUCTURE | 1 |
| 4 | RECORDING DENSITY | 1 |
| 5~16 | ASSIGNMENT OF DATA RECORDING AREA | 12 |
| 17~2048 | RESERVED AREA FOR FUNCTION EXPANSION (ALL 00h) | 2032 |

212 points to row 2.

FIG. 7

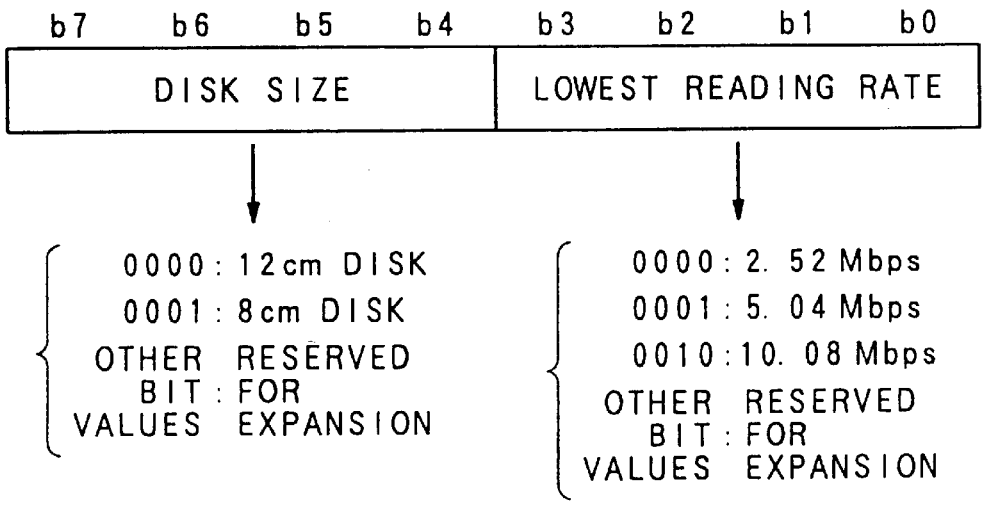

DISK SIZE AND LOWEST READING RATE 212

| b7 | b6 | b5 | b4 | b3 | b2 | b1 | b0 |
|---|---|---|---|---|---|---|---|
| DISK SIZE | | | | LOWEST READING RATE | | | |

DISK SIZE:
- 0000 : 12 cm DISK
- 0001 : 8 cm DISK
- OTHER BIT VALUES : RESERVED FOR EXPANSION

LOWEST READING RATE:
- 0000 : 2.52 Mbps
- 0001 : 5.04 Mbps
- 0010 : 10.08 Mbps
- OTHER BIT VALUES : RESERVED FOR EXPANSION

INFORMATION RECORD MEDIUM, APPARATUS FOR RECORDING THE SAME AND APPARATUS FOR REPRODUCING THE SAME

This is a continuation of copending application(s) application Ser. No. 08/806,458 filed Feb. 26, 1997, U.S. Pat. No. 6,236,804.

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Recently, as a data compressing technique to effectively utilize the memory capacity of an information record disk such as an optical disk for recording video information and the like, a variable rate system such as the MPEG 2 (Moving Picture Experts Group 2) method and the like is proposed. In general, in case of reducing the information amount by use of the compressing technique, the information amount after compression is not constant due to the property of the original signal and the like. This variable rate system is not a system which compress the information at a constant rate in case of recording the information after compression onto the record medium, but is a system which records the information after compression onto the record medium while compressing the information by a data or information compression rate, which is set as a rate appropriate and variable from scene to scene, by use of mutual relationships between the units of data or information successively recorded and reproduced, such as the units of video data related to one scene and the like.

In order to reproduce the data or information, which is recorded by this type of variable rate system and which information amount required for the reproduction (per unit time) is changed, from the record medium, there may be proposed two methods as following.

As a first method, there is a method of changing a linear velocity at a read position of an optical pickup for reading out the information in the reproducing apparatus with respect to a record portion of the information record disk (hereinbelow, it is referred to as a "reading linear velocity") at the time of reproducing the information, in accordance with the information amount after compression of the information record disk. The time change of the information amount after compression, which is read out per unit time at the time of reproducing the record information (hereinbelow, it is referred to as an "information rate"), and the time change of the rotation number of the disk i.e. the reading linear velocity at the time of reproduction according to this first method are shown in FIG. 17. As shown in FIG. 17, according to this first method, the data reading rate i.e. the reading linear velocity (or the rotation number) is changed in accordance with the information rate from time to time so as to always obtain the information rate required for the reproduction by the reproducing apparatus. In FIG. 17, the difference between the information rate, which is actually reproduced in accordance with the reading linear velocity (indicated by a dashed line), and the information rate of the record information after compression (indicated by a solid line), is corresponding to a loss at the time of reproduction due to various factors such as a reproduction of additional information and the like. As a result, since the data amount obtained through the optical pickup and the data amount required for the reproduction are almost coincident to each other, it is possible to reduce the size (i.e. the memory capacity) of a track buffer of the reproducing apparatus. Further, it is possible to restrain the consumption of the electric power, since the rotation number of the spindle motor for rotating the disk can be reduced to be a level of minimum requirement. Furthermore, a special control, such as a switching control for switching the stand by or waiting condition and the reproducing condition of the optical pickup and the like, is not necessary.

As a second method, there is a method of setting the data reading rate i.e. the reading linear velocity to match the upper limit of the information rate required for the reproduction (i.e., so as to be able to reproduce even in case of the upper limit) as shown in FIG. 18, and rotating the spindle motor at a speed to make this data reading rate constant. As a result, the frequency of the read out clock is made constant, so that it is enough to prepare just one PLL (Phase Lock Loop) circuit of normal type for the demodulation of the data.

However, according to the aforementioned first method, since the frequency of the read out clock is always changed, a special PLL circuit is required for the demodulation, the control of such a special circuit becomes complicated, and the rotation control of the spindle motor becomes also complicated, resulting in that this first method is not practical.

On the other hand, according to the aforementioned second method, since the data amount used for the demodulation is greatly changed, it is necessary for the optical pickup to repeat the reproducing condition, in which the optical pickup successively read out the information, and the stand by condition, in which the optical pickup is standing by on a same track, so that the control of the optical pickup becomes complicated. Further, since the difference between the data amount read out from the optical pickup and the data required for the demodulation is so large that it is necessary to install the reproducing apparatus with a track buffer of large size (i.e. large memory capacity). Furthermore, since the motor is always rotating in accordance with the highest speed, the power consumption is also increased. Therefore, especially in case of a portable player, the life of the buttery is shortened, resulting in that the convenience in usage is certainly degraded.

On the other hand, a proposal and a development are being made as for the DVD, as an optical disk in which the memory capacity is improved by about ten times without changing the size of the optical disk itself as compared with the aforementioned conventional CD. As for the DVD, it is expected that the information can be compressed and recorded by the aforementioned variable rate system. However, there is no proposal or development made as for a DVD technique to solve the problems owned by the aforementioned first and second methods. Further, in the technical art of the DVD, the actuality is such that a person having an ordinary skill in this art does not even recognize the problem or subject itself which happens at the time of applying the compression technique, such as the variable rate system, with respect to the DVD, which has the large memory capacity.

SUMMARY OF THE INVENTION

It is therefore an object of the present invention to provide an information record medium, which can be easily reproduced at various information rates, an apparatus for recording the information record medium, and an apparatus for reproducing the information record medium by use of a relatively simple construction.

The above object of the present invention can be achieved by an information record medium having a record track recorded with record information to be reproduced by an information reproducing apparatus. The information reproducing apparatus has a read device, and performs a reproduction while moving the read device along the record track at a predetermined reading linear velocity. The record information divided into a plurality of first data groups, each of which is a unit able to be accessed by the information reproducing apparatus, is recorded on the record track. Lowest reading rate information indicating a minimum requirement of a reading rate for the information reproducing apparatus to reproduce a reproduction unit, which comprises at least one of the first data groups and which is to be reproduced by the information reproducing apparatus such that a sequential logical meaning of the reproduction unit is continuous, is recorded on the record track at one portion different from another portion where the record information is recorded.

According to the information record medium of the present invention, the record information, such as video information, audio information and the like, is divided into a plurality of first data groups, and is recorded on the record track. Here, each of the first data groups is a unit able to be accessed in a logical meaning or physical meaning corresponding to the content of the record information, in the reproducing operation by use of the read device, such as an optical pickup, by the information reproducing apparatus. And that, the lowest reading rate information is recorded on the record track at one portion different from another portion where the record information is recorded. The lowest reading rate information indicates the minimum requirement of the reading rate for the information reproducing apparatus to reproduce the reproduction unit. This reproduction unit comprises at least one of the first data groups and is to be reproduced by the information reproducing apparatus such that a sequential logical meaning of the reproduction unit is continuous. Here, the meaning of "a sequential logical meaning of the reproduction unit is continuous" is that the logical meaning, which the content of the record information has, is continuous, in general. For example, if the record information is the video information, the meaning is that the display obtained by reproducing this video information is continuous. If the record information is the audio information, the meaning is that the audio sound output obtained by reproducing this audio information is continuous. On the other hand, the "lowest reading rate information" may be information directly indicating the reading rate, or may be information indicating the reading linear velocity corresponding to this reading rate i.e. the information indirectly indicating the lowest reading rate. Therefore, by reproducing the lowest reading rate information in advance of reproducing the record information, such as the video information, the audio information and the like, and by reproducing the record information at a reading linear velocity not less than a reading linear velocity able to obtain the minimum requirement of the reading rate indicated by the reproduced lowest reading rate information, it is possible to perform the reproducing operation satisfactorily while restraining the electric power consumption to be a relatively low level by restraining the operation amount of the reproducing apparatus such as the rotation of the spindle motor and the like, by the reproducing apparatus.

In one aspect of the information record medium of the present invention, at least one portion of the record information is compressed by a variable information rate and is recorded on the record track.

According to this aspect, although at least one portion of the record information is compressed by the variable information rate by means of the MPEG 2 method or the like, since the reproducing apparatus can use the reading linear velocity based on the lowest reading rate information, the reproducing operation can be performed while restraining the electric power consumption to be a relatively low level by use of a relatively simple construction, by the reproducing apparatus.

In another aspect of the information record medium of the present invention, the lowest reading rate information indicates one of a first reading rate and a second reading rate which is equal to the first reading rate multiplied by $½^n$ (n: natural number).

According to this aspect, since it is enough for the reproducing apparatus to perform the demodulation of the record information in accordance with the reading rate equal to the first reading rate multiplied by $½^n$ (n=1, 2, 3, . . . ), by employing a relatively simple construction i.e. the known frequency divider for merely frequency-dividing one frequency signal to ½ times, ¼ times, . . . , as the PLL for the demodulation, the reproduction which is harmonized with the information rate and which electric power consumption is low can be performed.

In another aspect of the information record medium of the present invention, the reproduction unit is a whole of the information record medium, and the lowest reading rate information is recorded at a lead in area of the information record medium.

According to this aspect, by firstly reproducing the lead in area and determining the reading linear velocity on the basis of the reproduced lowest reading rate information, the reproduction of the whole of the information record medium can be easily performed by use of this determined reading linear velocity.

In another aspect of the information record medium of the present invention, the reproduction unit comprises a plurality of second data groups, each of which is a unit able to be logically divided in the reproduction by the information reproducing apparatus and comprises sequential first data groups arranged along the record track among the first data groups. The lowest reading rate information is recorded at a predetermined portion on the record track for each of the second data groups.

According to this aspect, in case of reproducing each of the second data groups, by firstly reproducing the lowest reading rate information corresponding to respective one of the second data groups, and determining the reading linear velocity for each of the second data groups on the basis of this reproduced lowest reading rate information, the reproduction of each of the second data groups can be easily performed by use of this determined reading linear velocity. Therefore, in a case where the lowest reading rates are considerably different from each other between the second data groups, by employing the reading linear velocity suitable for each of the second data groups, the electric power consumption can be restrained to be a low level as a whole.

In another aspect of the information record medium of the present invention, the record information comprises at least one of video information and audio information. Each of the first data groups comprises the at least one information and control information including access information, which is information to access the at least one information.

According to this aspect, it is possible to easily access the video information, the audio information or the like for each first data group, on the basis of the access information by the reproducing apparatus.

The above object of the present invention can be also achieved by an information recording apparatus for recording record information onto an information record medium having a record track recorded with the record information to be reproduced by an information reproducing apparatus, which has a read device, and performs a reproduction while moving the read device along the record track at a predetermined reading linear velocity. The information recording apparatus is provided with: a record device for recording the record information divided into a plurality of first data groups, each of which is a unit able to be accessed by the information reproducing apparatus, onto the record track, and for recording lowest reading rate information indicating a minimum requirement of a reading rate for the information reproducing apparatus to reproduce a reproduction unit, which comprises at least one of the first data groups and which is to be reproduced by the information reproducing apparatus such that a sequential logical meaning of the reproduction unit is continuous, onto the record track at one portion different from another portion where the record information is recorded; and an input device for inputting the lowest reading rate information.

According to the information recording apparatus of the present invention, the record information such as the video information, the audio information and the like, are recorded on the record track by the record device. Here, when the lowest reading rate information indicating the minimum requirement of the reading rate is inputted by the input device, it is recorded on the record track at the predetermined portion by the record device. Therefore, it is possible to record the aforementioned information record medium of the present invention.

In one aspect of the information recording apparatus of the present invention, the record device records the lowest reading rate information indicating one of a first reading rate and a second reading rate which is equal to the first reading rate multiplied by $\frac{1}{2}^n$ (n: natural number).

According to this aspect, since the lowest reading rate information, indicating one of the first and second reading rates, is recorded by the record device, it is possible to record the aforementioned information record medium of the present invention.

In another aspect of the information recording apparatus of the present invention, the record information comprises at least one of video information and audio information, each of the first data groups comprises the at least one information and control information including access information, which is information to access the at least one information. The information recording apparatus is further provided with an access information generation device for generating the access information in association with the at least one information.

According to this aspect, since the access information to access the video information and/or the audio information is generated in association with these informations, by the access information generation device, and since the video information, the audio information and the control information including this access information are recorded by the record device, it is possible to record the aforementioned information record medium of the present invention.

The above object of the present invention can be also achieved by an information reproducing apparatus for reproducing an information record medium. In the information record medium, record information divided into a plurality of first data groups, each of which is a unit able to be accessed is recorded on a record track thereof, and in which lowest reading rate information indicating a minimum requirement of a reading rate to reproduce a reproduction unit, which comprises at least one of the first data groups and which is to be reproduced such that a sequential logical meaning of the reproduction unit is continuous, is recorded on the record track at one portion different from another portion where the record information is recorded. The information reproducing apparatus is provided with: a read device for reading information recorded at a predetermined read position on the record track; a drive device for moving the information record medium along the record track with respect to the read device; a reproduction device for reproducing the information read by the read device; and a controlling device for controlling the read device, the drive device and the reproduction device to reproduce the lowest reading rate information in advance of reading the record information by the read device, and to reproduce the record information by reading the record information at a reading linear velocity not less than a reading linear velocity able to obtain the minimum requirement of the reading rate indicated by the reproduced lowest reading rate information.

According to the information reproducing apparatus of the present invention, the information record medium is moved in a direction along the record track with respect to the read device by the drive device. The information recorded at the predetermined read position on the record track is read by the read device. The information read by the read device is reproduced by the reproduction device. Here, under the control of the control device, in advance of reading the record information such as the video information, the audio information and the like, the lowest reading rate information recorded for each reproduction unit is reproduced. Then, the record information in each reproduction unit is reproduced by reading the record information at a reading linear velocity not less than a reading linear velocity able to obtain the minimum requirement of the reading rate indicated by the reproduced lowest reading rate information. Therefore, it is possible to perform the reproducing operation satisfactorily while restraining the electric power consumption to be a relatively low level by restraining the operation amount of the reproducing apparatus such as the rotation of the spindle motor and the like, according to this lowest reading rate information by the reproducing apparatus.

In one aspect of the information reproducing apparatus of the present invention, the control device determines the reading linear velocity for reading the record information on the basis of the reproduced lowest reading rate information, and outputs a drive control signal to the drive device to move the information record medium at the determined reading linear velocity.

According to this aspect, when the lowest reading rate information is reproduced, the reading linear velocity for reading the record information is determined on the basis of this reproduced lowest reading rate information, by the control device. Then, on the basis of the drive control signal outputted from the control device, the information record medium can be moved at this determined reading linear velocity, by the drive device.

In another aspect of the information reproducing apparatus of the present invention, the control device determines the reading linear velocity for reading the record information on the basis of the reproduced lowest reading rate information, and outputs a reproduction control signal to the reproduction device to reproduce the record information read by the read device by use of predetermined parameters for reproduction, which correspond to the determined reading linear velocity.

According to this aspect, when the lowest reading rate information is reproduced, the reading linear velocity for reading the record information is determined on the basis of this reproduced lowest reading rate information, by the control device. Then, on the basis of the reproduction control signal outputted from the control device, the record information read by the read device is reproduced by the reproduction device, by use of predetermined parameters for reproduction, which correspond to this determined reading linear velocity.

In another aspect of the information reproducing apparatus of the present invention, the lowest reading rate information indicates one of a first reading rate and a second reading rate which is equal to the first reading rate multiplied by $\frac{1}{2}^n$ (n: natural number), and the reproduction device is provided with a PLL (Phase Lock Loop) circuit having a frequency divider for demodulating the record information read by the read device.

According to this aspect, since it is enough to perform the demodulation of the record information in accordance with the reading rate equal to the first reading rate multiplied by $\frac{1}{2}^n$ (n=1, 2, 3, ... ), the record information read by the read device can be demodulated by use of a relatively simple construction i.e. a PLL (Phase Lock Loop) circuit having the known frequency divider, so that the reproduction which is harmonized with the information rate and which electric power consumption is low can be performed.

In another aspect of the information reproducing apparatus of the present invention, the reproduction unit is a whole of the information record medium. The lowest reading rate information is recorded at a lead in area of the information record medium. The control device controls the read device, the drive device and the reproduction device to reproduce the lead in area so as to reproduce the lowest reading rate information in advance of reading the record information by the read device, determines the reading linear velocity for reading the record information on the basis of the reproduced lowest reading rate information in the lead in area, and controls the read device, the drive device and the reproduction device to reproduce the record information at the determined reading linear velocity for a whole of the information record medium.

According to this aspect, the lead in area is firstly reproduced. Then, the reading linear velocity is determined on the basis of this reproduced lowest reading rate information, by the control device. Therefore, the reproduction of the whole of·the information record medium can be easily performed by use of this determined reading linear velocity.

In another aspect of the information reproducing apparatus of the present invention, the reproduction unit comprises a plurality of second data groups, each of which is a unit able to be logically divided in the reproduction and comprises sequential first data groups arranged along the record track among the first data groups, the lowest reading rate information is recorded at a predetermined portion on the record track for each of the second data groups, and the control device controls the read device, the drive device and the reproduction device to reproduce the predetermined portion for each of the second data groups in advance of reading the record information by the read device, determines the reading linear velocity for reading the record information for each of the second data groups, on the basis of the reproduced lowest reading rate information for respective one of the second data groups, and controls the read device, the drive device and the reproduction device to reproduce the record information at the determined reading linear velocity for each of the second data groups.

According to this aspect, when each of the second data groups is to be reproduced, the lowest reading rate information corresponding to respective one of the second data groups is firstly reproduced. Then, the reading linear velocity for each of the second data groups is determined on the basis of this reproduced lowest reading rate information, by the control device. Thus, the reproduction of each of the second data groups can be easily performed by use of this determined reading linear velocity. Therefore, in a case where the lowest reading rates are considerably different from each other between the second data groups, by employing the reading linear velocity suitable for each of the second data groups, the electric power consumption can be restrained to be a low level as a whole.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6 is a diagram showing a data structure of a physical format information in FIG. 5;

FIG. 7 is a diagram showing a concrete data structure of a portion of the data in FIG. 6;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

first data group: VOBU (VOB (Video OBject)-Unit)
second data group: VTS (Video Title Set) or cell
control information: PCI (Presentation Control Information)

(I) Embodiment of Information Record Medium

First of all, a physical structure and a logical structure as well as an operation of a DVD, as one embodiment of the information record medium to which the present invention is applied, will be explained with reference to FIGS. 1 to 3.

Figure 1:
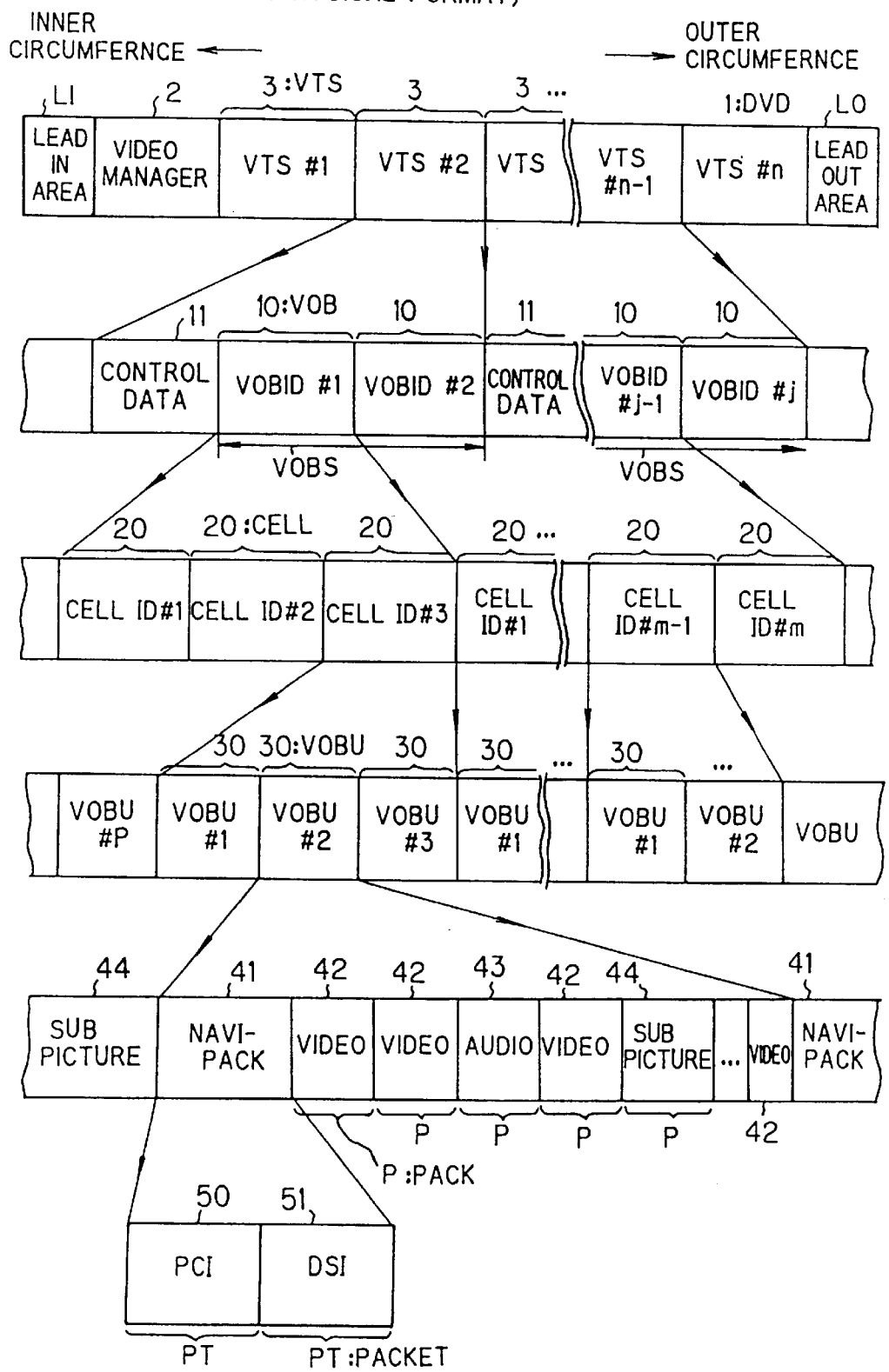
FIG. 1 is a diagram showing a physical structure of record information of a DVD as one embodiment of the present invention.

At first, a record format of video information and audio information recorded on a record track of the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information and audio information are recorded along the record track such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video-and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture, is recorded. In the video data 42, which data amount is relatively large as shown in FIG. 1, one or a plurality of GOPs are recorded within one VOB unit 30. The pack P for the audio data 43 and the pack P for the sub picture data 44 are disposed intermittently between the packs P for the video data 42. It is prescribed by a standard specification of the DVD that there are 8 kinds of audio recordable on the DVD 1 while 32 kinds of sub picture recordable on the DVD 1.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Finally, the navi-pack 41 is provided with: a DSI (Data Search Information) data 51 including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 including information related to a display control at a time of displaying the video image or outputting the audio sound, which is searched on the basis of the information of the DSI data 51. Further, all video data included in one VOBU 30 consist of at least one GOP (Group Of Pictures). In the PCI data 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture data 44 as the sub picture information.

Further, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1, especially in the control data 11.

Figure 3:
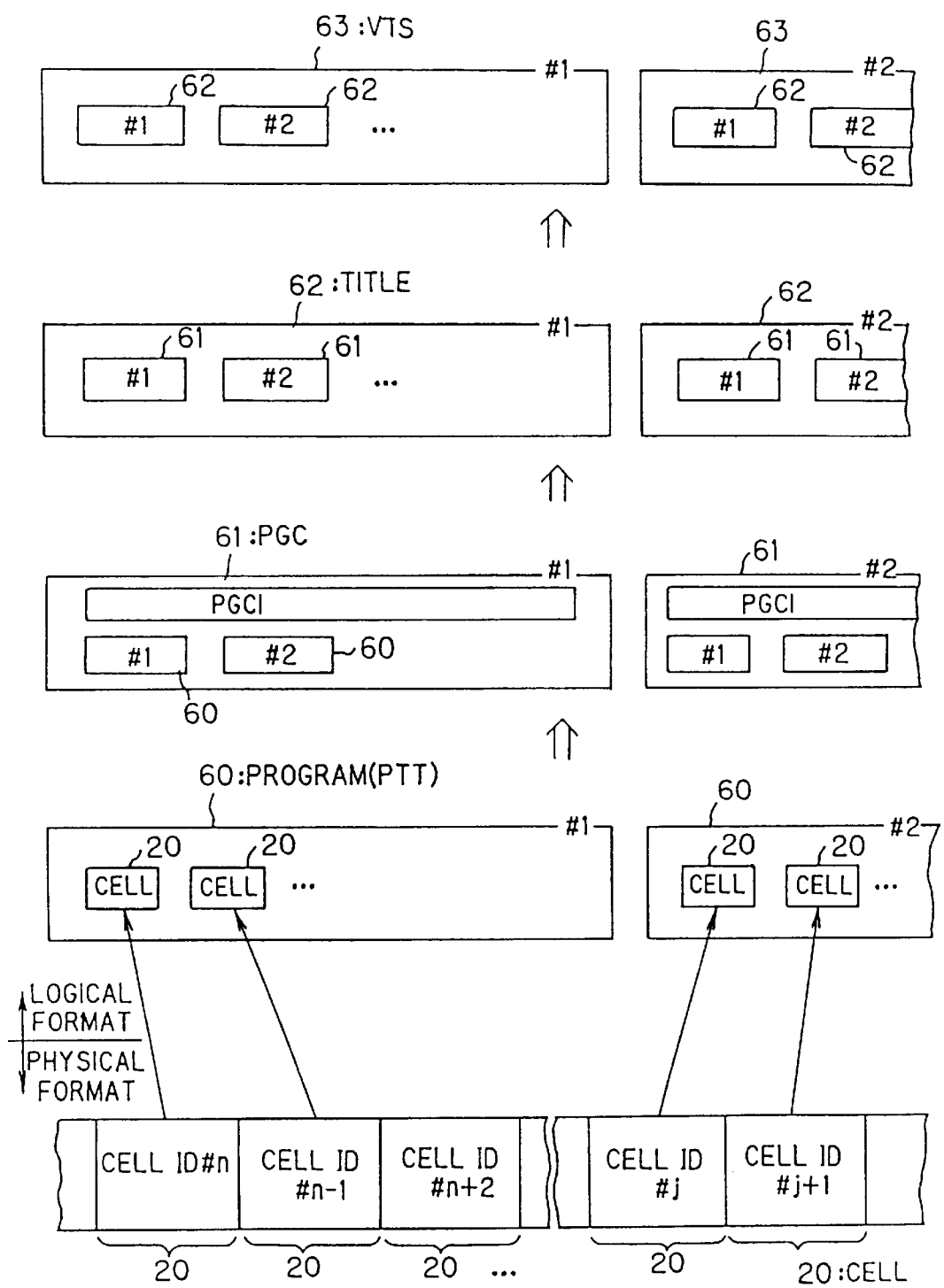
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]: and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Figure 2:
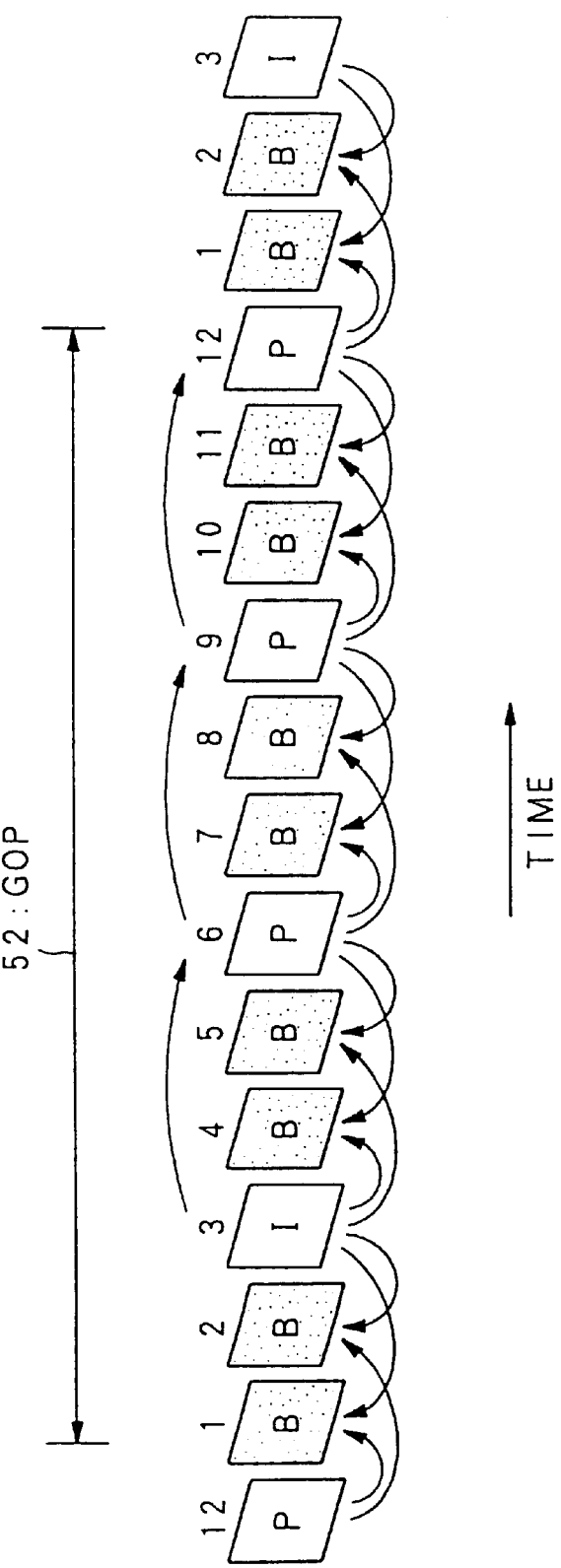
FIG. 2 is a diagram showing frame pictures constructing a GOP.

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
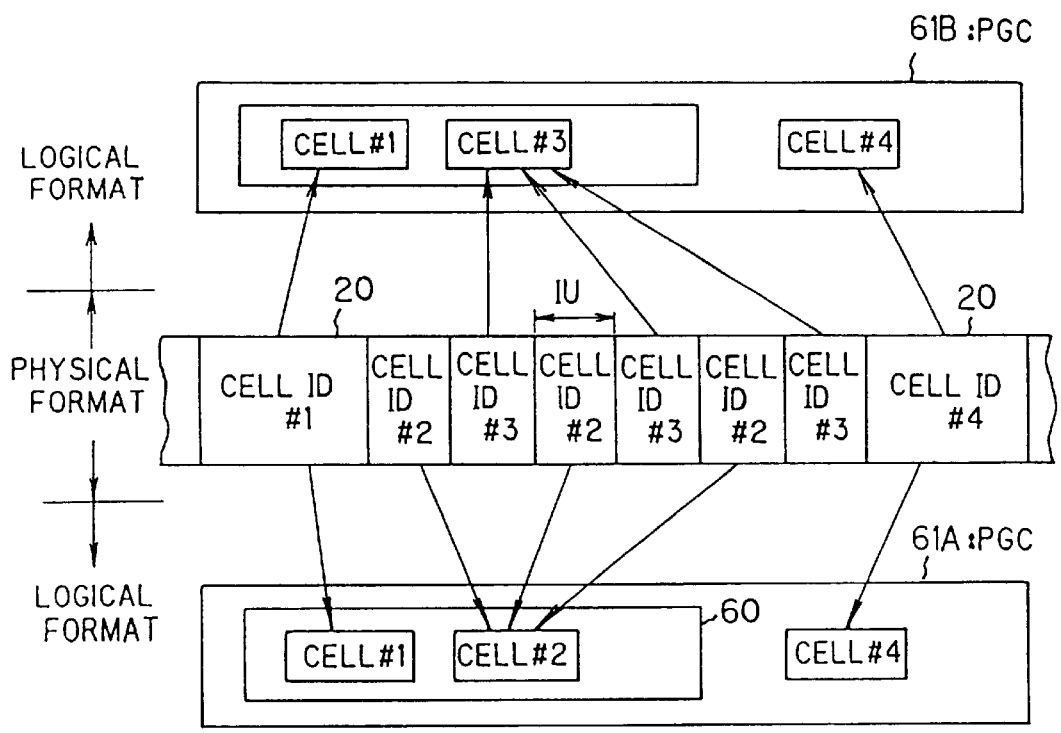
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at the track buffer (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Nextly, among the above described physical structure and the logical structure, the structure related to the lowest reading rate information, which is information indicating a lowest reading rate for each disk (i.e. each DVD), is explained in detail.

The present embodiment is constructed such that the lowest reading rate is set for each DVD on the basis of the compressing rate of the video information and the audio information recorded on the whole of the DVD 1, so as to reproduce the whole portion of one DVD 1 at a same linear velocity, and that the lowest reading rate information indicating this lowest reading rate is recorded on a predetermined position of each DVD 1. The lowest reading rate able to be set here is limited to either one of the maximum value of the reading rate and a reading rate equal to the maximum value multiplied by $\frac{1}{2}^n$ (n: natural number). The maximum rate of the reading rate and the number of the reading rates able to be set are determined appropriately depending upon the specification of each of various reproducing apparatuses. Here, for example, it is assumed that one of 10.08 Mbps (Mega bits per second) as the maximum value, 5.04 Mbps as the reading rate equal to the maximum value multiplied by ½ (=½$^1$), and 2.52 Mbps as the reading rate equal to the maximum value multiplied by ¼ (=½$^2$) can be selected.

Figure 5:
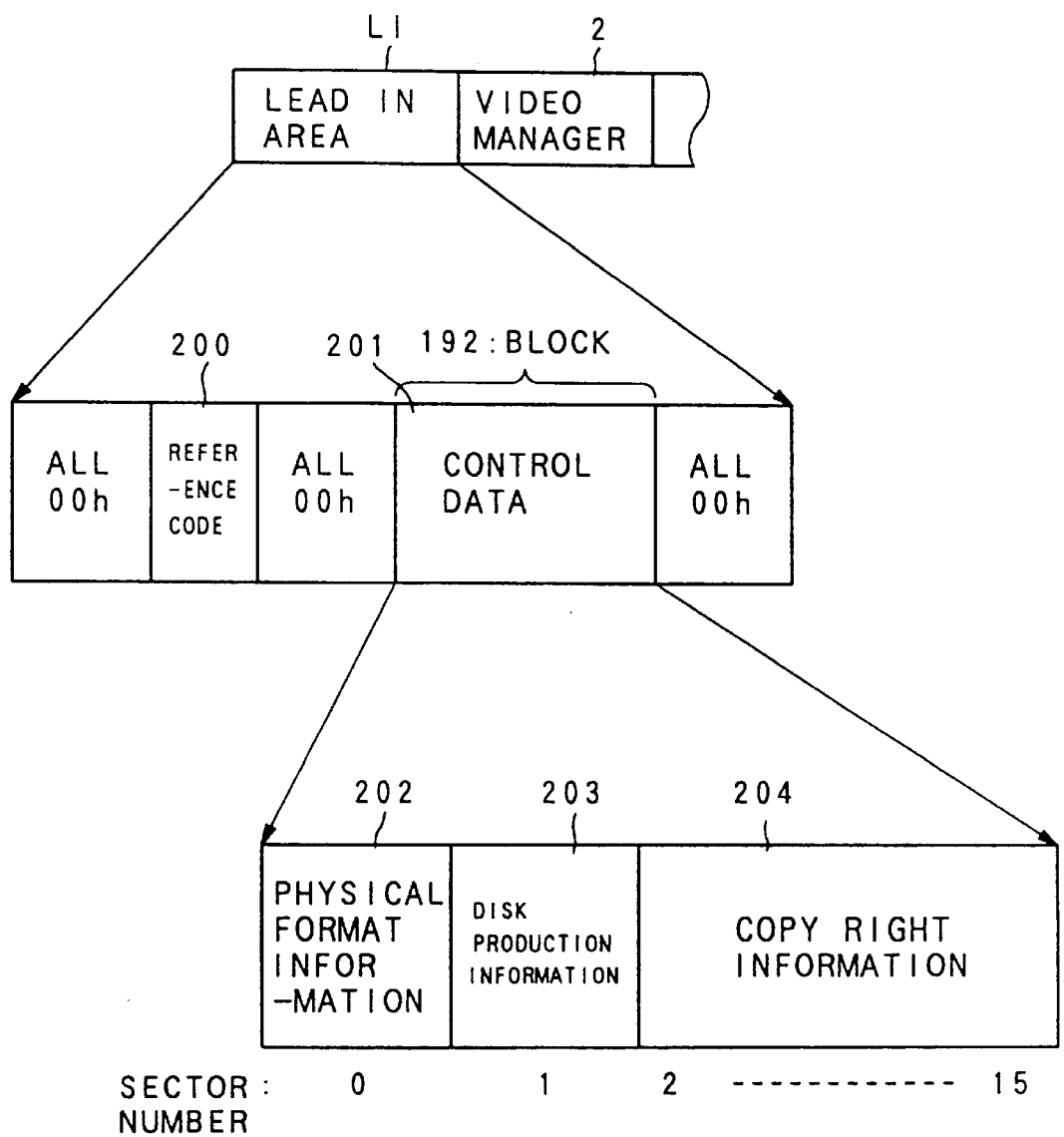
FIG. 5 is a diagram showing a data structure of a lead in area of the DVD in FIG. 1.

As shown in FIG. 5, the lead in area LI shown in FIG. 1 is provided with a control data 201, which consists of 192 blocks, besides the reference code 200. Other than these portions, the values "00h" are all recorded to be used for the future expansion.

In FIG. 5, the control data 201 is provided with: physical format information 202; disk production information 203, which is information related to the disk production; and a copy light information 204 indicating a copy prohibition and the like. The physical format information 202 is recorded at a position of the relative sector number 0. The disk production information 203 is recorded at a position of the relative sector number 1. The copy light information 204 is recorded at a position of the sector numbers 2 to 15. Among those, the physical format information 202 has a data structure as shown in FIG. 6.

In FIG. 6, the physical format information 202 includes: one byte information indicating a book type and a version of the information stored in the DVD; one byte information related to the structure of the disk; one byte information indicating the recording density; and 12 bytes information indicating the assignments of the data recording area. The physical format information 202 also includes one byte information 212 indicating the disk size and the lowest reading rate.

The one byte information 212 indicating the disk size and the lowest reading rate has such a structure that, as shown in FIG. 7, four bits b7 to b4 are assigned to the binary data indicating the size of the disk, and that four bits b3 to b0 are assigned to the binary data indicating the lowest reading rate. Here, the lowest reading rate information indicates that it is necessary to rotate the DVD at a linear velocity able to obtain at least the reading rate indicated by the lowest reading rate information at the time of reproduction. In the present embodiment, for example, if the values of the bits b3 to b0 are "0000", this information indicates that the lowest reading rate is 2.5 Mbps. If these values are "0001", it indicates that the lowest reading rate is 5.04 Mbps. If these values are "0010", it indicates that the lowest reading rate is 10.08 Mbps.

Although the other binary data such as "0011" is not specifically prescribed in the present embodiment, it is possible to prescribed the other binary data as indicating the other lowest reading rate.

In this manner, since the lowest reading rate information 212 provided in the lead in area LI indicates the lowest reading rate of each DVD, it is possible to easily set the reading rate by a unit of each disk, by firstly reading this data at the time of reproducing the DVD by the reproducing apparatus described later.

In the above described embodiment, although it is assumed that the lowest reading rate is constant by a unit of each DVD (i.e., the reading linear velocity is constant for each DVD), the DVD 1 may be constructed such that the lowest reading rate is constant by a unit of each VTS (Video Title Set) 3 shown in FIG. 1, for example, and that different lowest reading rates are set to respective VTSs 3. In this case, the lowest reading rate information is preferably constructed in the aforementioned control data 11 in each VTS 3. Therefore, at the reproducing apparatus, by reproducing this control information 11 in advance of reproducing the substantial data such as the video information, the audio information or the like in each VTS 3, and by setting the reading rate in accordance with the lowest reading rate information in the reproduced control data 11, it is possible to perform the reproduction in accordance with the lowest reading rate exclusive for each VTS, such that the reading rate is set as 10.08 Mbps for the VTS #1, set as 2.52 Mbps for the VTS-#2, set as 5.04 Mbps for the VTS #3 and so on, in FIG. 1, for example.

Further, different lowest reading rates may be set for respective VOBUs 30, each of which is a minimum unit able to be logically accessed in FIG. 1. In this case, it is preferable to construct the lowest reading rate information in the navi-pack 41 included in by each VOBU 30.

In this manner, the unit of reproduction, in which the reading rate is to be constant by the reproducing apparatus, and the lowest reading rate in each unit may be selected appropriately depending upon the content of the data, which the author or producer of the DVD intends to record, or the specification of each of various reproducing apparatuses.

Since the DVD has such a large memory capacity that, in addition to one movie, the audio voices and captions (titles) in a plurality of kinds of languages corresponding to this one movie can be recorded on a single optical disk, it is effective to apply the above described record format especially to the DVD 1.

(II) Embodiment of Recording Apparatus

Next, an embodiment of recording apparatus for recording the above mentioned control information, video information and audio information onto the DVD 1 will be explained with reference to FIG. 8.

At first, a construction and an operation of the recording apparatus as the embodiment is explained with reference to FIG. 8.

Figure 8:
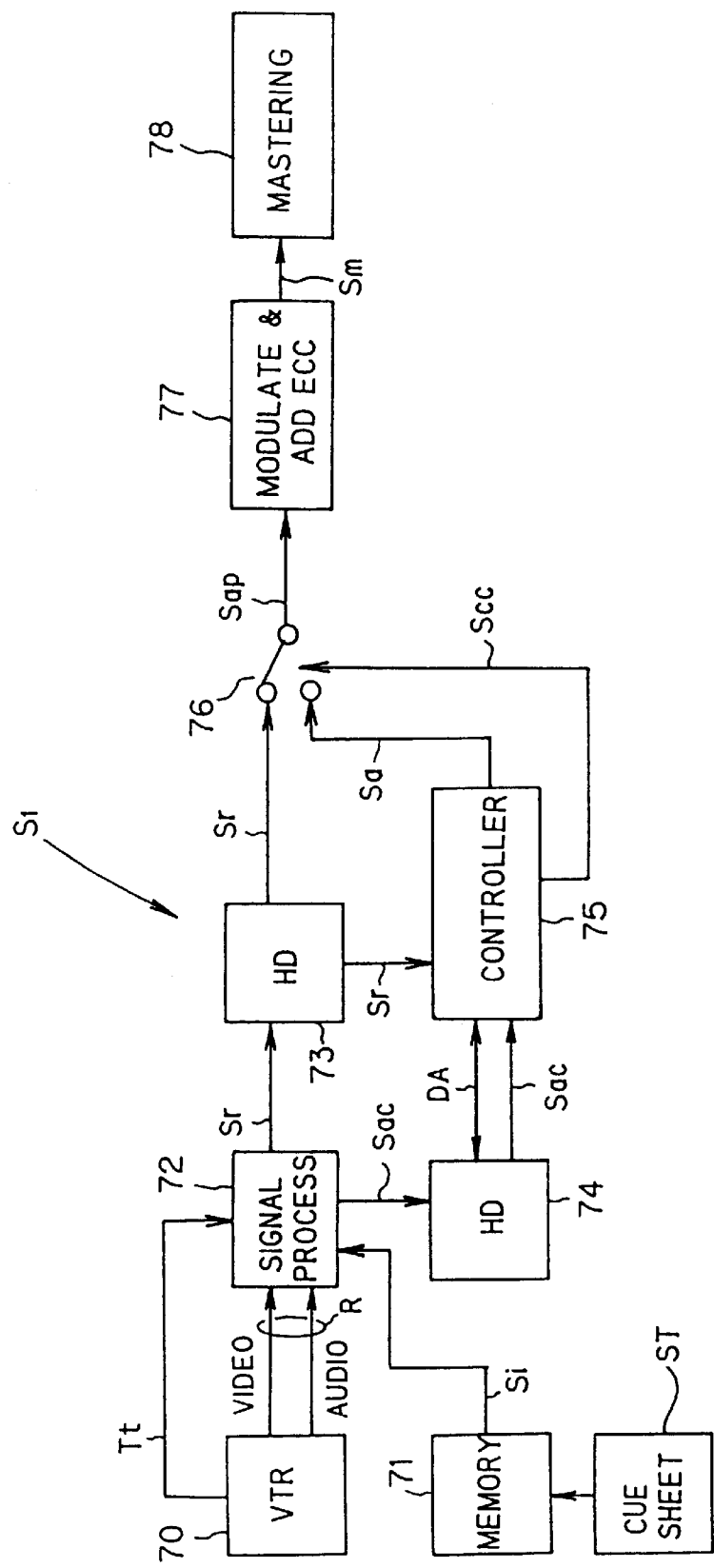
FIG. 8 is a block diagram of an information recording apparatus for recording the DVD in FIG. 1, as another embodiment of the present invention.

As shown in FIG. 8, a recording apparatus SI as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record informations Pr in advance, and temporarily stores content information related to the partial record information Pr which is inputted beforehand on the basis of a cue sheet ST as for each partial record information Pr, on which the lowest reading rate as for the DVD 1 is especially written. Then, the memory 71 outputs it as a content information signal Si on the basis of a request from the signal process unit 72.

Then, the signal process unit 72 generates and outputs an access information signal Sac corresponding to the partial record information Pr with referring to a time code Tt, on the basis of the time code Tt corresponding to the record information R outputted from the VTR 70 and the content information signal Si outputted from the memory 71. Then, the access information signal Sac is temporarily stored in the hard disk device 74.

The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. This is because there may be a control signal, which content is determined in dependence upon a generation result of the compressed multiplexed signal Sr among various control signals. On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed Sap. If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

Nextly, the detail operation of the recording apparatus S1 for recording the lowest reading rate information onto the master disk is explained.

At first, the information selection signal Scc to select the additional information signal Sa is outputted by the controller 75 at a timing corresponding to the access information signal Sac generated on the basis of the content information Si, which is inputted by the cue sheet ST and which specifies the lowest reading rate. Thus, the multiplexer 76 is switched to the side for the additional information signal Sa.

At this time, the lowest reading rate able to be set is especially limited to either one of the maximum value of the reading rate and a reading rate equal to the maximum value multiplied by $½^n$ (n: natural number). Here, for example, it is assumed that one of 10.08 Mbps as the maximum value, 5.04 Mbps as the reading rate equal to the maximum value multiplied by ½, and 2.52 Mbps as the reading rate equal to the maximum value multiplied by ¼ can be selected.

Then, the lowest reading rate information as shown in FIG. 7, which is set in this manner, is inputted to the modulator 77 as one portion of the additional information signal Sa, which constructs the lead in area LI, and is further inputted to the mastering device 78 as one portion of the disk record signal Sm.

Next, the information selection signal Scc to select the compressed multiplexed signal Sr is outputted by the controller 75, so that the multiplexer 76 is switched to the side for the compressed multiplexed signal Sr. Then, the video data, the audio data and the sub picture data of the pertinent VOBU are inputted successively as the information added compressed multiplexed signal Sap to the modulator 77. This operation is repeatedly performed for a plurality of VOBUs, and is further repeatedly performed for a plurality of VTSs.

As a result of the above, according to the present embodiment, it is possible to produce the master disk, on which the physical format information including the lowest reading rate information at a predetermined position within the lead in area LI.

As aforementioned, in case that the lowest reading rate is to be set for each VTS, for example, the disk record signal Sm is generated such that the lowest reading rate information is included in the control data of each VTS. In case that the lowest reading rate is to be set for each VOBU, the disk record signal Sm is generated such that the lowest reading signal information is included in the navi-pack of each VOBU.

(III) Embodiment of Reproducing Apparatus

Next, an embodiment of reproducing apparatus for reproducing the information from the DVD 1, on which the above described control information, video information and audio information are recorded by the above mentioned recording apparatus will be explained with reference to FIGS. 9 to 16.

At first, a construction and an operation of the reproducing apparatus as the embodiment is explained with reference to FIG. 9.

Figure 9:
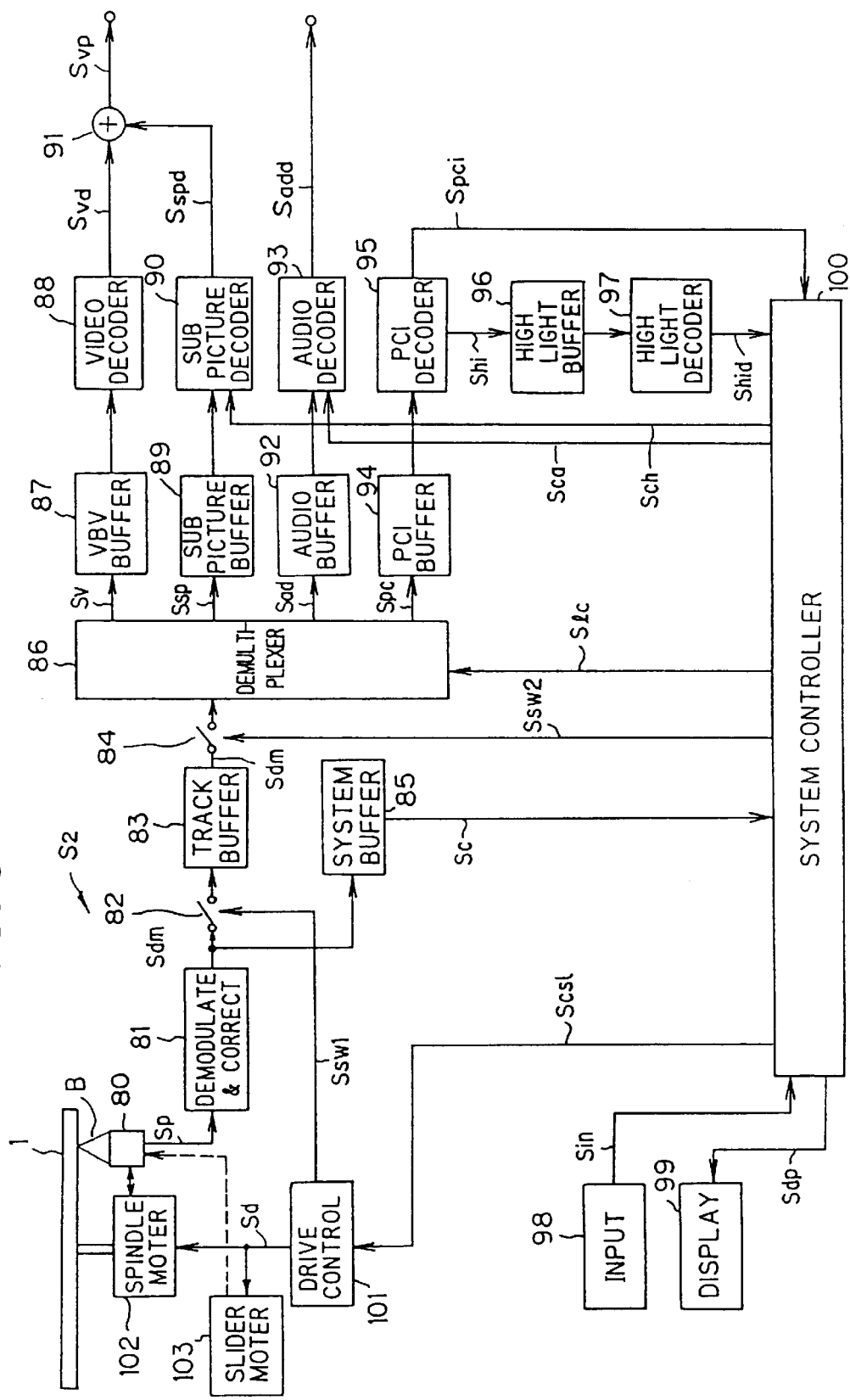
FIG. 9 is a block diagram of an information reproducing apparatus for reproducing the DVD in FIG. 1, as another embodiment of the present invention.

As shown in FIG. 9, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 9 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Sswl from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI data 51 for each navi-pack 41 (refer to FIG. 1) as the occasion demands while reproducing the information, to output it also as the control information Sc.

The demultiplexer 86, to which the demodulation signal Sdm is continuously inputted through the stream switch 84, separates the video information, the audio information, the sub picture information and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method. Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video information, the audio information and the sub picture information corresponding to the PCI data 50, and apply the PCI data 50 to the video information and the like. Then, from the PCI signal Spc, which is synchronized with the corresponding the video information and the like by the PCI buffer 94, a high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal Slc, the pause signal Sca and the high light control signal Sch to correctly perform the reproduction corresponding to those input signals, and also outputs a display signal Sdp to display an operation condition etc. of the reproducing apparatus S2 to the display unit 99 such as the liquid crystal device.

Further, the system controller 100 outputs a seamless control signal Scsl corresponding to the track jump process, to the drive controller 101, when it detects by the aforementioned PCI information signal Spci etc. that it is necessary to perform the track jump process such as a search in order to perform the seamless reproduction.

Then, the drive controller 101, to which the seamless control signal Scsl is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 9), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scsl, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Figure 10:
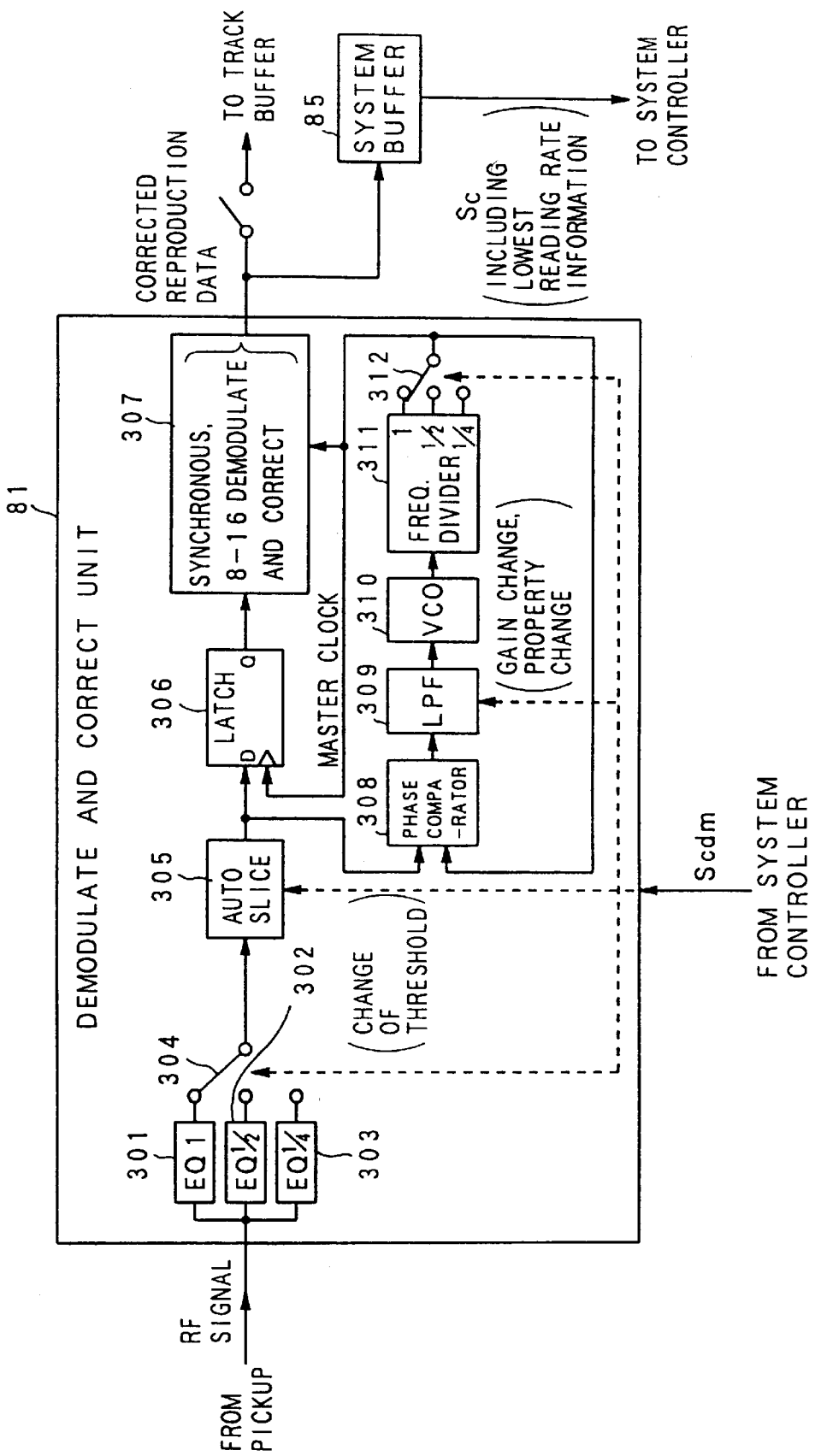
FIG. 10 is a block diagram of a demodulate and correct unit 81 of the information reproducing apparatus in FIG. 9.

As shown in FIG. 10, especially in the present embodiment, the demodulate and correct unit 81 is provided with: an equalizer (EQ) 301; an equalizer 302; an equalizer 303; a switch 304; an auto-slice circuit 305; a latch circuit 306; a signal process circuit 307 including a synchronous circuit, an 8–16 demodulate circuit and an error correct circuit; a phase comparator 308; a LPF (Low Pass Filter) 309; a VCO (Voltage Controlled Oscillator) 310; a frequency divider 311; and a switch 312.

As shown in FIG. 9, to the system controller 100, the lowest reading rate information shown in FIG. 7 is inputted as one portion of the control signal Sc through the system buffer 85. Then, the system controller 100 supplies the demodulation control signal Scdm to the demodulate and correct unit 81 in correspondence with the content of this lowest reading rate information. The demodulate and correct unit 81 shown in FIG. 10, which receives this demodulation control signal Scdm, operates as following.

Namely, the equalizer 301 is an equalizer (for 1 time multiplication) corresponding to the maximum value of the lowest reading rate, the equalizer 302 is an equalizer (for ½ times multiplication) corresponding to ½ of the maximum value, and the equalizer 303 is an equalizer (for ¼ times multiplication) corresponding to ¼ of the maximum value. The RF signal from the optical pickup is inputted to these equalizers 301 to 303 respectively. The switch 304 selects one of these equalizers 301 to 303, which corresponds to the lowest reading rate information read from the DVD 1 according to the demodulation control signal Scdm from the system controller.

The auto-slice circuit 305 slices the inputted signal through the switch 304 with a predetermined slice level, and generates a shaped digital signal. The band range, where this slice level is followed, is switched in correspondence with the lowest reading rate information, by the demodulation control signal Scdm supplied by the system controller 100. The latch circuit 306 latches the shaped digital signal from the auto-slice circuit 305 at the timing of a master clock supplied from the frequency divider circuit 311. The signal process circuit 307 takes in this latched signal at the timing of the master clock supplied by the frequency divider 311, and applys the synchronous process, the 8–16 demodulation process and the error correction process to this taken in signal.

The phase comparator 308 compares the phase of the master clock supplied by the frequency divider 311 and the phase of the shaped reproduction signal outputted from the auto-slice circuit 305 with each other, and outputs a comparison output to the LPF 309. The LPF 309 low-pass-filters the comparison output by use of a gain and a property, which are changed by the demodulation control signal Scdm supplied from the system controller 100. The VCO 310 oscillates a frequency signal in correspondence with the output voltage of the LPF 309. The frequency divider 311 frequency-divides this oscillated frequency signal by $\frac{1}{2}^n$ times (n: natural number) such as by 1 time, by ½ times, by ¼ times, . . . and so on. The switch 312 selects one of the frequency-divided outputs of the frequency divider 311, which corresponds to the lowest reading rate information read out from the DVD 1, according to the demodulation control signal Scdm from the system controller 100. As a result, the master clock is supplied through the switch 312 to the latch circuit 306, the signal process circuit 307 and the phase comparator 308.

As described above, according to the present embodiment, the PLL circuit can be constructed by use of a rather simple construction, by combining one VCO 310 and the frequency divider 311.

Nextly, among the operations of the reproducing apparatus S2, the operation of setting the reading linear velocity of the system controller 100 especially related to the present invention, is explained with reference to FIGS. 9 to 15.

Figure 11:
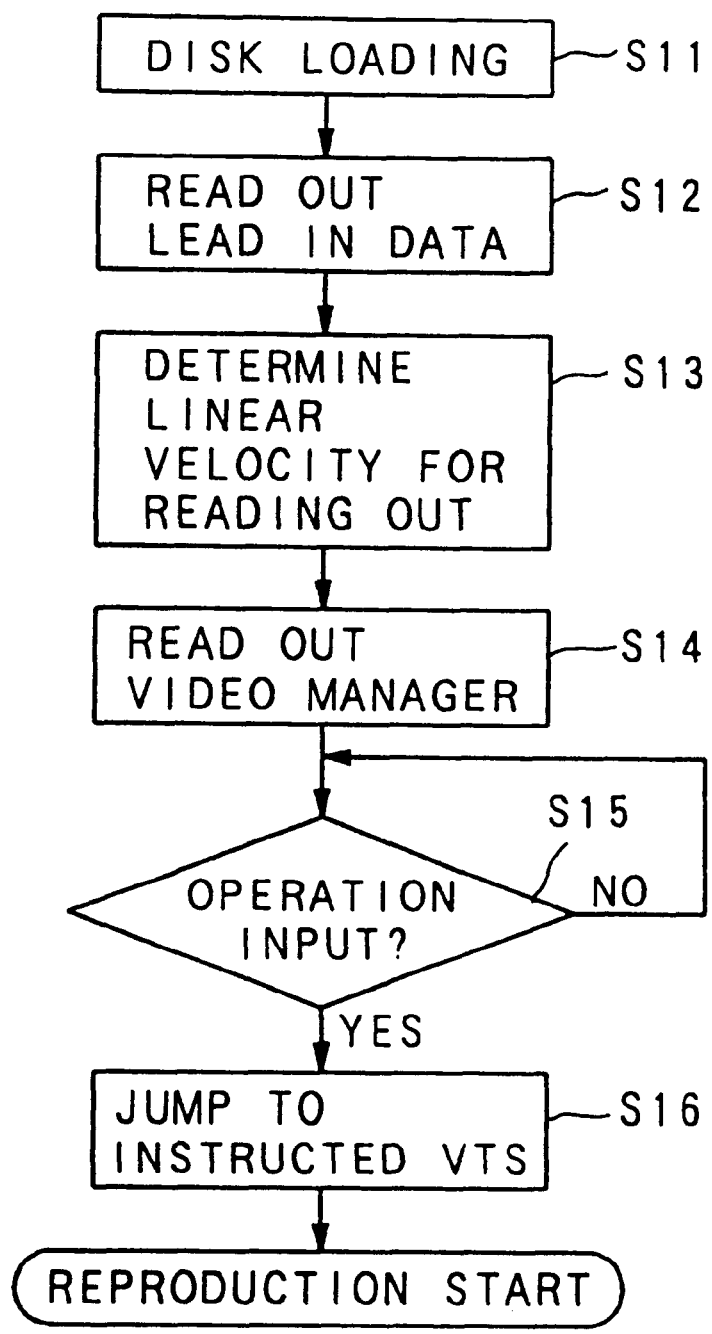
FIG. 11 is a flow chart showing one example of an operation of the information reproducing apparatus in FIG. 9.

FIG. 11 shows a flow chart of one example of the operation of setting the reading linear velocity and starting the reproduction of the DVD 1.

In FIG. 11, at first, when the disk (i.e. the DVD 1) is loaded on the reproducing apparatus S2 (step S11), the spindle motor 102 is rotated so as to rotate the disk at a predetermined linear velocity for reading the lead in area LI, and the reading operation of the data in the lead in area LI is performed (step S12). Here, the predetermined linear velocity may be a (rather fast) linear velocity corresponding to 10.08 Mbps in order to shorten the time period for reading out. Alternatively, it may be a (rather slow) linear velocity corresponding to 2.54 Mbps in case of a portable player or the like and in case that it is desired to restrain the consumption of the buttery by the motor. Further, an arbitrary linear velocity for reading the lead in area LI may be employed. As a result, the system controller 100 can obtain the lowest reading rate information in the physical format information included in the lead in area LI as shown in FIGS. 6 and 7, as one portion of the control information Sc, from the disk (DVD 1).

Nextly, the reading linear velocity at the time of reproduction is determined on the basis of the lowest reading rate information which has been read out, and the parameter settings of the units and circuits in the reproducing apparatus S2, which are required to correspond to respective linear velocities, are changed (step S13). More concretely, in FIG. 10, the system controller 100 switches the switch 304 for the equalizers 301 to 303, switches the following band range of the slice level in the auto-slice circuit 304, switches the switch 312 as for the outputs of the frequency divider 311, and changes the gain and property of the LPF 309, via the demodulation control signal Scdm in correspondence with this lowest reading rate information. Further, the system controller 100 performs settings of various parameters to rotate the spindle motor at the rotation number corresponding to the determined reading linear velocity, with respect to the drive controller 101 for the spindle control, and also performs settings of various parameters for the FTS (Frequency and Timing Subsystem) circuit.

When this reading linear velocity is obtained, the video manager 2 positioned next to the lead in area LI as shown in FIG. 1 is read out by this linear velocity (step S14). Then, an operation input by the audience is waited for, and the optical pickup is made in the standing-by or waiting condition (step S15). Here, if there is the operation input (step S15: YES), the optical pickup 80 is track-jumped to the VTS instructed by the operation input (step S16), so that the reproduction is started.

Figure 12:
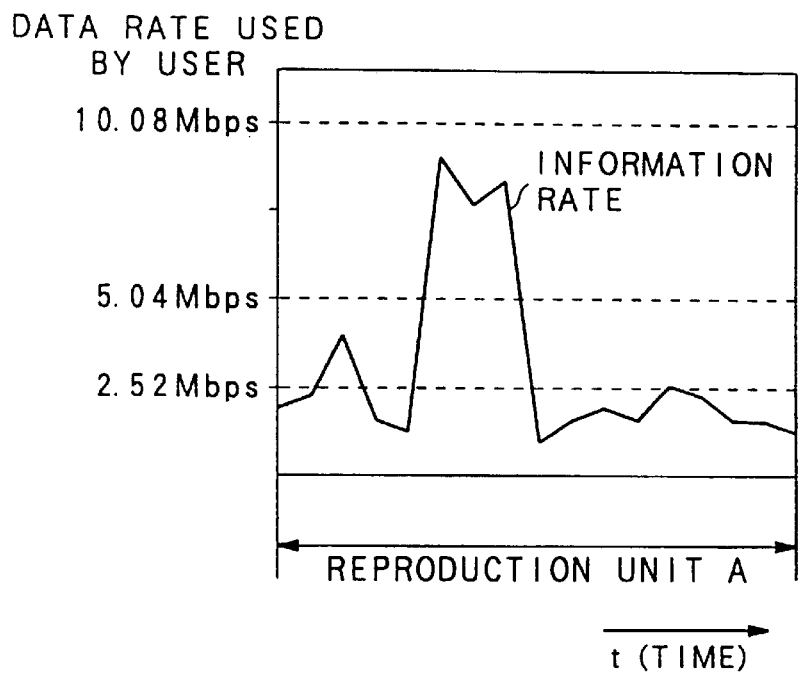
FIG. 12 is one graph for explaining an operation of selecting the linear velocity of the information reproducing apparatus in FIG. 9.
Figure 13:
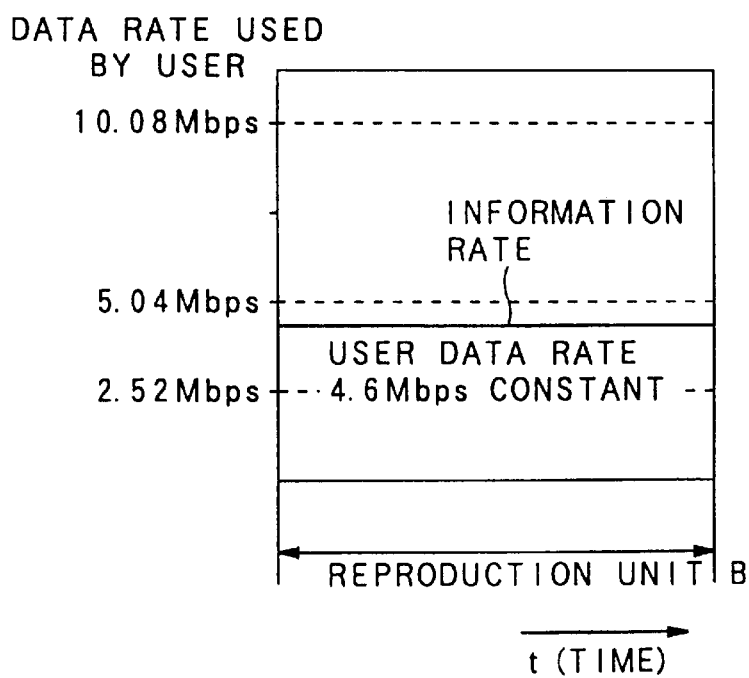
FIG. 13 is another graph for explaining an operation of selecting the linear velocity of the information reproducing apparatus in FIG. 9.
Figure 14:
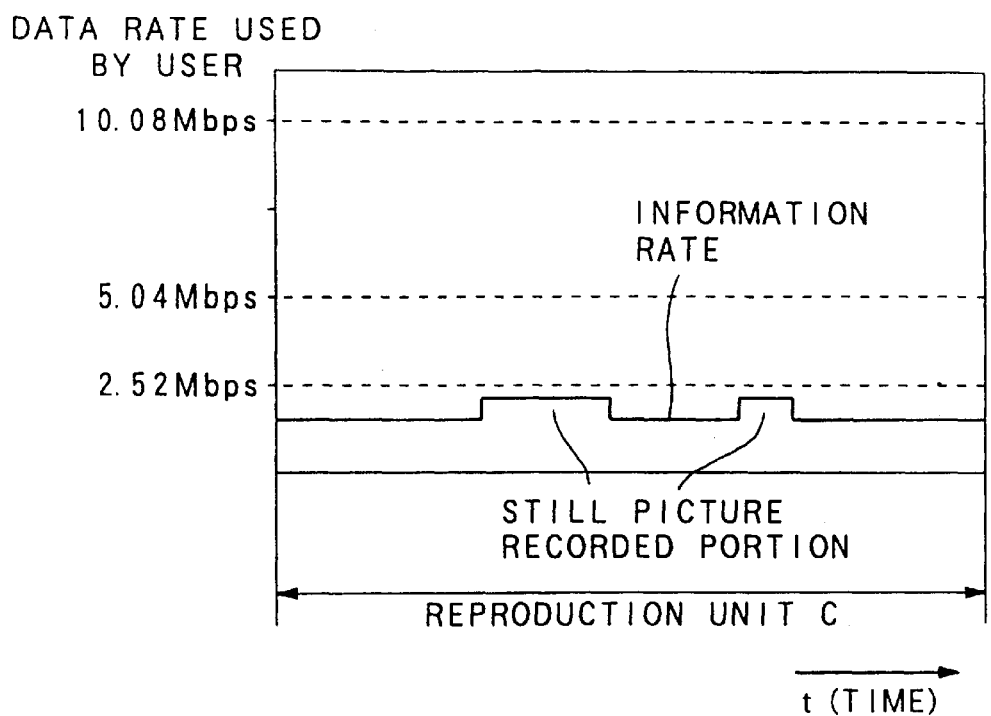
FIG. 14 is another graph for explaining an operation of selecting the linear velocity of the information reproducing apparatus in FIG. 9.

With reference to FIGS. 12 to 14, various aspects of determining the reading linear velocity at the reproducing apparatus S2 on the basis of the lowest reading rate information read out from the DVD 1, is, explained in more detail. The examples shown in FIGS. 12 to 14 represent cases where the DVDs, which recording methods are different from each other, are reproduced by the reproducing apparatus S2.

In the graphs of FIGS. 12 to 14, each abscissa represents "time" at the reproducing operation, while the reading linear velocities able to be switched or selected in the reproducing apparatus S2 (i.e. the three kinds of reading linear velocities of 10.08 Mbps, 5.04 Mbps and 2.54 Mbps) are indicated on each ordinate.

The graph of FIG. 12 shows a case where the DVD, on which the ordinary (not-compressed) video information, the compressed audio information and the sub picture information are recorded, is reproduced. Since the maximum value of the information rate exceeds 5.04 Mbps, the reading linear velocity is determined to be a value not less than 3.48 m/s (meter/second) so as to always obtain the 10.08 Mbps, according to the present embodiment. In correspondence with this determined value, the switching operations and the setting operations of various parameters are performed as aforementioned under the control of the system controller 100 at each unit and circuit of the reproducing apparatus S2. In this case, although the consumption of the buttery is relatively large, the reproduction itself can be performed satisfactorily.

The graph of FIG. 13 shows a case where the DVD, on which only the audio information is recorded by the linear PCM (Pulse Coded Modulation) method under the condition of 96 kHz, 24 bits and 2 channels, is reproduced. Although the information rate is always constant at 4.6 Mbps, since this value exceeds 2.52 Mbps, the reading linear velocity is determined to be a value not less than 1.74 m/s so as to always obtain the 5.04 Mbps, according to the present embodiment. In correspondence with this determined value, the switching operations and the setting operations of various parameters are performed as aforementioned under the control of the system controller 100 at each unit and circuit of the reproducing apparatus S2. In this case, the consumption of the buttery is relatively small, and the reproduction itself can be performed satisfactorily.

The graph of FIG. 14 shows a case where the DVD, on which the still picture data and the linear PCM audio data are recorded, is reproduced. Since the information rate is limited such that the maximum value thereof does not exceed 2.52 Mbps, the reading linear velocity is determined to be a value not less than 0.87 m/s so as to always obtain the 2.52 Mbps, according to the present embodiment. In correspondence with this determined value, the switching operations and the setting operations of various parameters are performed as aforementioned under the control of the system controller 100 at each unit and circuit of the reproducing apparatus S2. In this case, the consumption of the buttery is the smallest among those examples, and the reproduction itself can be performed satisfactorily.

As understood from the above examples, according to the present embodiment, it is possible to select the reading linear velocity optimum for each occasion, which is very advantageous.

In the present embodiment, since it is assumed that the whole portion of one disk (DVD) is reproduced at the constant linear velocity, the examples shown in FIGS. 12 to 14 correspond to the operations for reproducing three disks respectively. However, it is also possible to record the three types of data, which are respectively same as those in the above explained three examples, on one disk (DVD). In this case, the linear velocity is made constant for each predetermined reproduction unit such as the VTS (Video Title Set) or the VOBU (VOB unit) as aforementioned, and that the lowest reading rate information is included in the control data, the navi-pack or the like, for each of the predetermined reproduction unit.

Here, the relationship between the information rate and the reading linear velocity is explained.

In the present embodiment, the DVD 1 is reproduced by the reproducing apparatus S2 by means of the CLV (Constant Linear Velocity) method, for example. In this case, if the record track is read at the linear velocity of 3.48 m/s, the 10.08 Mbps can be obtained as the information rate on the side of the DVD 1 (i.e. the data rate used by the user).

Then, the relationship between the linear velocity and the rotation number of the spindle motor 102 is expressed by a following expression.

$$v = r \times 2\pi \times N$$

wherein linear velocity: v rotation number N radius at the read position r

Figure 15:
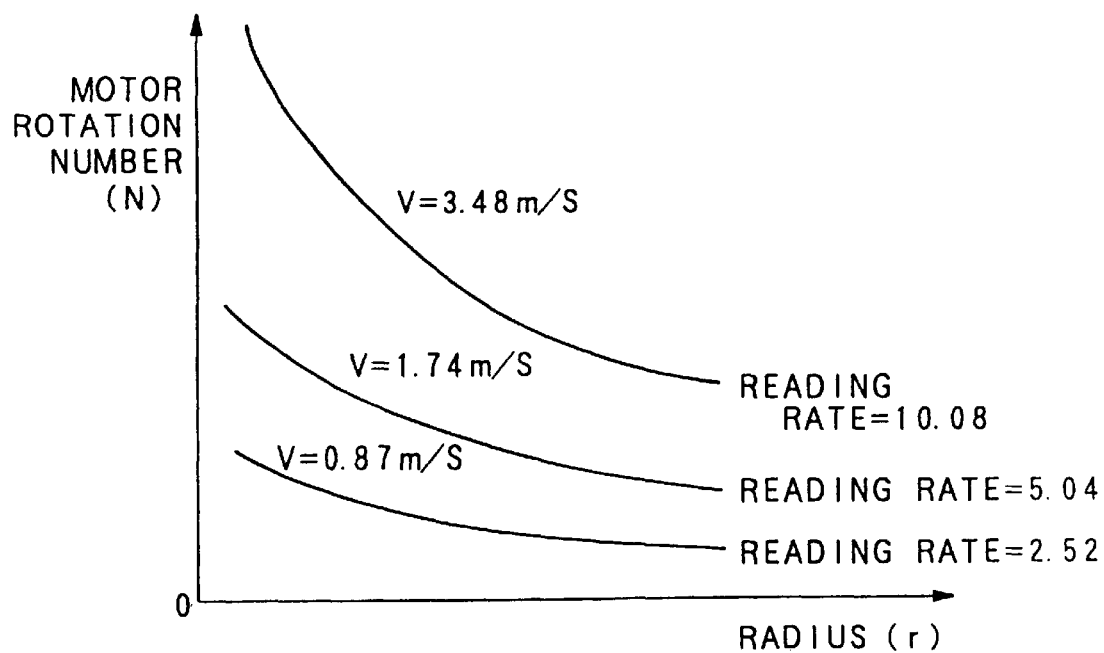
FIG. 15 is a graph showing a relationship between a motor rotation number and a linear velocity (a reading rate) of the information reproducing apparatus in FIG. 9.

Therefore, the rotation number with respect to the radius r at the reading position for each linear velocity has a characteristic as shown in FIG. 15.

As a result, according to the present embodiment, on the basis of the relationship indicated by the graph shown in FIG. 15, the system controller 100 can control the rotation number N of the spindle motor 102 in accordance with the radius r at the read position of the optical pickup 80 and the determined linear velocity v.

Figure 16:
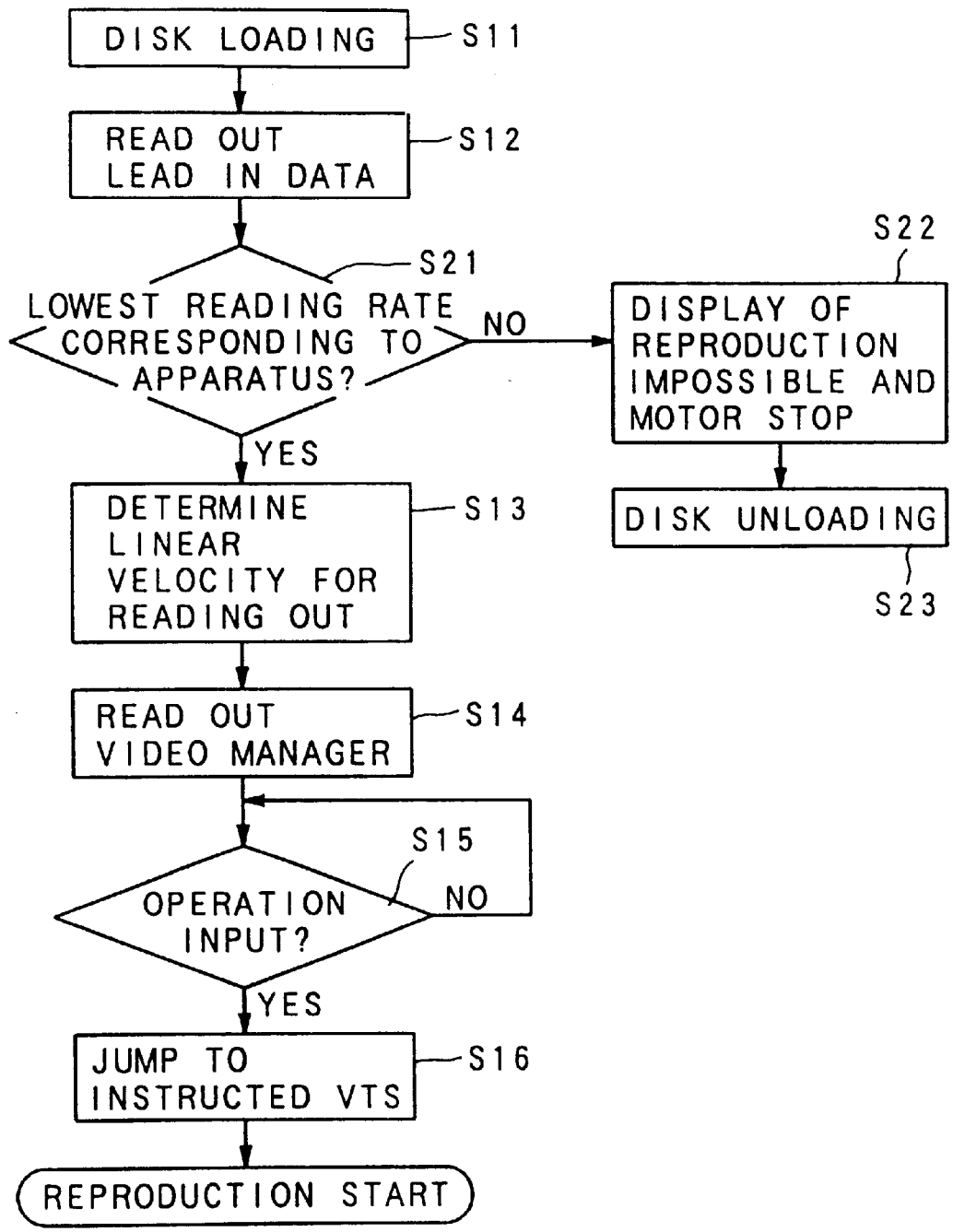
FIG. 16 is a flowchart showing another example of an operation of the information reproducing apparatus in FIG. 9.

FIG. 16 shows a flow chart of another example of the operation of starting the reproduction of the DVD 1 after setting the reading linear velocity.

According to the operation shown in FIG. 11, the reproducing apparatus S2 corresponds to the three kinds of reading linear velocities i.e. 10.08 Mbps, 5.04 Mbps and 2.52 Mbps. In contrast to this, according to the operation shown in FIG. 16, the reproducing apparatus S2 does not corresponds to these three kinds of reading linear velocities. Fore example, in case of a player exclusive for the audio, there may exist a player, which does not corresponds to 10.08 Mbps or 5.04 Mbps. In FIG. 16, the same steps as those in FIG. 11 carry the same step numbers, and the detailed explanations thereof are omitted.

In FIG. 16, at first, when the disk (i.e. the DVD 1) is loaded on the reproducing apparatus S2 (step S11), the spindle motor 102 is rotated so as to rotate the disk at a predetermined linear velocity for reading the lead in area LI, and the reading operation of the data in the lead in area LI is performed (step S12). As a result, the system controller 100 can obtain the lowest reading rate information in the physical format information included in the lead in area LI as shown in FIGS. 6 and 7, as one portion of the control information Sc, from the disk (DVD 1).

Next, it is judged whether or not the reproducing apparatus S2 corresponds to the reading rate indicated by this lowest reading rate information, by the system controller 100 (step S21). Here, if its is not judged to correspond (step S21: NO), a predetermined display message, such as "This cannot be replayed by this player" for example, is displayed on the display unit 99, and the spindle motor 102 is stopped (step S22). Then, the disk (DVD 1) is unloaded from the main body of the reproducing apparatus S2 (step S23).

On the other hand, if it is judged to correspond (step S21: YES), the operations of the aforementioned steps S13 to S16 are performed on the basis of the lowest reading rate information, which is read out at the step S12, in the same manner as the example shown in FIG. 11.

In this manner, it is possible to construct the present embodiment as a portable player such that it does not correspond to 10.08 Mbps or 5.04 Mbps (i.e. the relatively high information rate) so as to utilize the characteristic of the portable type.

Figure 17:
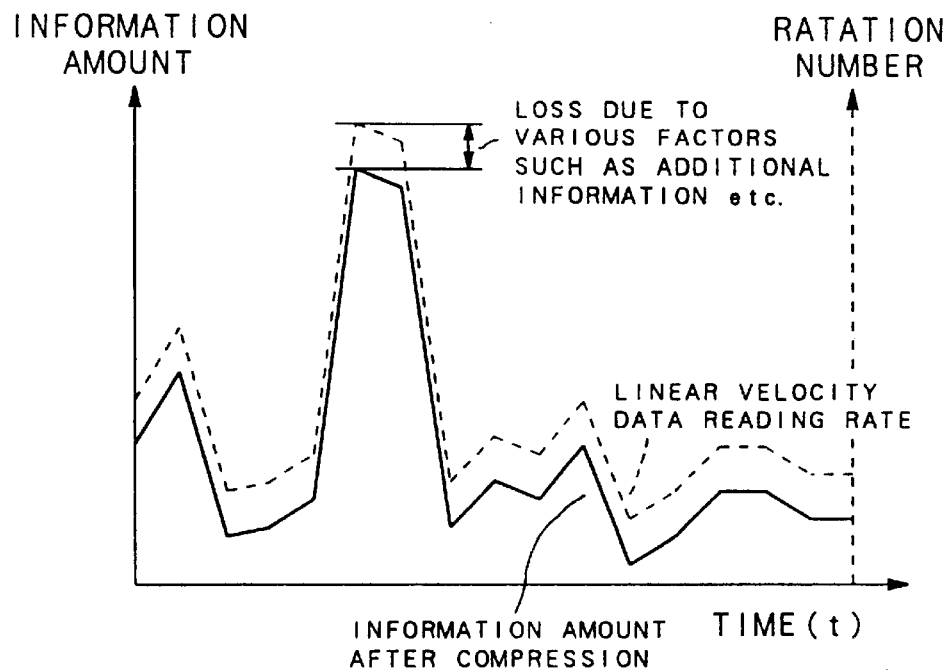
FIG. 17 is a graph for explaining the first method of reproducing the information recorded in the variable rate system according to the related art.
Figure 18:
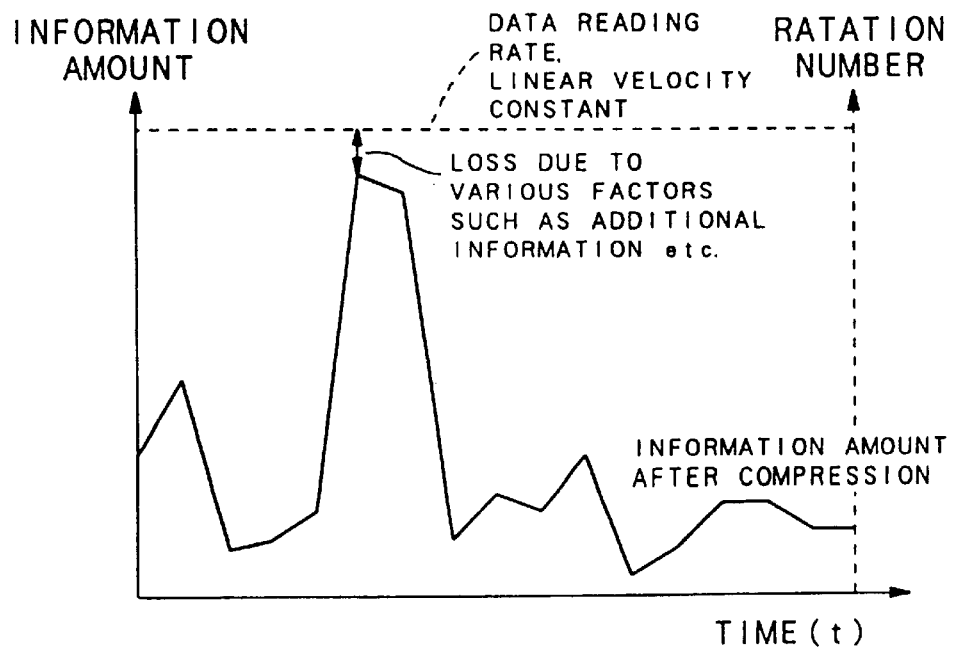
FIG. 18 is a graph for explaining the second method of reproducing the information recorded in the variable rate system according to the related art.

As described above in detail, the information record medium (DVD), from which the various types of information e.g., the information which is compressed and recorded by the variable rate as in the MPEG 2 method or by the constant rate as in the MPEG 1 method, the information which is not compressed such as the linear PCM data, can be easily reproduced while restraining the electric power consumption to be a relatively low level in the reproducing apparatus, can be realized by the present embodiment. The information record apparatus (S1) suitable for recording the information record medium, and the information reproducing apparatus (S2) for reproducing the information record medium by use of a relatively simple construction, can be also realized by the present embodiments. Especially, in case of the linear PCM data, since the data rate required for its reproduction is varied depending upon the number of channels, the present embodiment is very effective. Further, since the reading linear velocity can be set as the rate equal to the maximum linear velocity multiplied by $½^n$ (n: natural number) in the reproducing apparatus S2, the rotation number of the spindle motor can be limited to be also $½^n$ as compared with the case of reproducing at the maximum linear velocity. Therefore, since the electric power consumption is reduced in proportional to the square of the rotation number, such that the electric power consumption is reduced by ¼ if the linear velocity is ½, the electric power consumption is reduced by ⅟₁₆ if the linear velocity is ¼ and so on, if the present embodiments are applied to a portable player, it is very advantageous from a view point of the reduction of the electric power consumption. Further, in this case, since the PLL, which is difficult to be realized in case of the aforementioned first method in the related art (refer to FIG. 17), can be realized by the combination of one VOC and the mere frequency divider, it is very advantageous. Furthermore, since it is enough that the rotation number of the spindle motor corresponds to just predetermined kinds of linear velocities which are set in advance, and it is not necessary to change the linear velocity so often, the control of the rotation number can be rather easily performed.

In addition, according to the reproducing apparatus S2 of the present embodiment, while restraining the electric power consumption, it is possible to perform the interactive and variegated reproductions, in which the selection branches are prepared for the audience as for the video images and the audio sounds reproduced from the compressed information, and in which the audience can select one of the selection branches to watch and listen, by means of the variable rate system or the fixed rate system by use of a rather simple construction.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An article of manufacture comprising:

a recording disk having a record track, which is readable by an information reproducing apparatus;

record information recorded on the record track of the recording disc;

lowest reading rate information recorded on the record track of the recording disk which specifies a specified linear velocity corresponding to a minimum requirement of a reading rate to reproduce the record information, and disk size information recorded on the record track of the recording disk which indicates a size of the recording disk, wherein the lowest reading rate information and disk size information are recorded at a predetermined portion on the record track different from a portion where the record information is recorded, and wherein the predetermined portion is a minimum processable unit of one byte for data processing, in which both of the lowest reading rate information and the disk size information are collectively recorded.

2. The article of manufacture of claim 1, wherein the predetermined portion is provided in a lead-in area of the recording disk.

3. An information recording apparatus for recording record information onto a recording disk having a record track comprising:

a first record device for recording lowest reading rate information which specifies a specified linear velocity corresponding to a minimum requirement of a reading rate and disk size information which indicates a size of the recording disk onto the record track of the recording disk;

a second record device for recording the record information onto the record track of the recording disk, wherein the lowest reading rate information and disk size information are recorded at a predetermined portion on the record track different from a portion where the record information is recorded, and wherein the predetermined portion is a minimum processable unit of one byte for data processing, in which both of the lowest reading rate information and the disk size information are collectively recorded.

4. The information recording apparatus of claim 3, wherein the predetermined portion is provided in a lead-in area of the recording disk.

5. An information reproducing apparatus for reproducing record information recorded on a record track of a recording disk wherein lowest reading rate information which specifies a specified linear velocity corresponding to a minimum requirement of a reading rate and disk size information which indicates a disk size of the recording disk are recorded at a predetermined portion on the record track different from a portion where the record information is recorded comprising:

a read device for reading the record information, the lowest reading rate information, and the disk size information from the recording disk;

a disk drive device for rotating the recording disk at a rotational velocity corresponding to the specified linear velocity;

a reproduction device for reproducing the record information read by the read device; and a control device for setting the disk drive device at the specified linear velocity.

6. The information reproducing apparatus of claim 5, wherein the predetermined portion is provided in a lead-in area of the recording disk.

7. The apparatus of claim 5, wherein the predetermined portion is a minimum processable unit for data processing, in which both of the lowest reading rate information and the disk size information are recorded.

8. The apparatus of claim 7, wherein the minimum processable unit has a length of one byte.

9. An article of manufacture comprising:

a recording disk having a record track, which is readable by an information reproducing apparatus;

record information recorded on the record track of the recording disc;

a maximum value of a reading rate recorded on the record track of the recording disk, and disk size information recorded on the record track of the recording disk which indicates a size of the recording disk, wherein the maximum value and the disk size information are recorded at a predetermined portion on the record track different from a portion where the record information is recorded, and wherein the predetermined portion is a minimum processable unit of one byte for data processing, in which both of the maximum value and the disk size information are collectively recorded.

10. The article of manufacture of claim 9, wherein the predetermined portion is provided in a lead-in area of the recording disk.

11. The article of manufacture of claim 9, wherein the maximum value is one of the maximum value and a reading rate equal to the maximum value multiplied by $(½)^n$ (n: natural number).

12. The article of manufacture of claim 9, wherein the maximum value is one of 10.08 Mbps, 5.04 Mbps and 2.52 Mbps.

13. An information recording apparatus for recording record information onto a recording disk having a record track comprising:

a first record device for recording a maximum value of a reading rate and disk size information which indicates a size of the recording disk onto the record track of the recording disk, a second record device for recording the record information onto the record track of the recording disk, wherein the maximum value and the disk size information are recorded at a predetermined portion on the record track different from a portion where the record information is recorded, and wherein the predetermined portion is a minimum processable unit of one byte for data processing, in which both of the maximum value and the disk size information are collectively recorded.

14. The apparatus of claim 13, wherein the predetermined portion is provided in a lead-in area of the recording disk.

15. The apparatus of claim 13, wherein the maximum value is one of the maximum value and a reading rate equal to the maximum value multiplied by $(½)^n$ (n: natural number).

16. The apparatus of claim 13, wherein the maximum value is one of 10.08 Mbps, 5.04 Mbps and 2.52 Mbps.

17. An information reproducing apparatus for reproducing record information recorded on a record track of a recording disk wherein a maximum value of a reading rate and disk size information which indicates a disk size of the recording disk are recorded at a predetermined portion on the record track different from a portion where the record information is recorded comprising:

a read device for reading the record information, the maximum value, and the disk size information from the recording disk;

a disk drive device for reading the record information corresponding to the reading rate;

a reproduction device for reproducing the record information read by the read device; and a control device for setting the disk drive device at the reading rate, wherein the predetermined portion is a minimum processable unit of one byte for data processing, in which both the maximum value and the disk size information are collectively recorded.

18. The apparatus of claim 17, wherein the predetermined portion is provided in a lead-in area of the recording disk.

19. The apparatus of claim 17, wherein the maximum value is one of the maximum value and a reading rate equal to the maximum value multiplied by $(½)^n$ (n: natural number).

20. The apparatus of claim 17, wherein the maximum value is one of 10.08 Mbps, 5.04 Mbps and 2.52 Mbps.

21. The apparatus of claim 13, further comprising:
a read device for reading the record information, the maximum value, and the disk size information from the recording disk;
a disk device for reading the record information corresponding to the reading rate;
a reproduction device for reproducing the record information read by the read device; and
a control device for setting the disk drive device at the reading rate.

22. A disk comprising:
a control information area which stores control information; and
a recording information area which stores record information;
wherein the control information comprises rate information for controlling a rotation speed of the disk and disk size information which indicates a size of the disk, and
wherein the rate information and the disk size information is collectively recorded as one byte information.

23. The disk of claim 22, wherein the rate information is one of a maximum value of reading rate and the maximum value multiplexed by $(½)^n$ (n: natural number).

24. The disk of claim 22, wherein the rate information is one of 10.08 Mbps, 5.04 Mbps and 2.52 Mbps.

25. A The disk of claim 22, wherein the control information area is in a lead-in area.

26. An information recording apparatus for recording record information onto a disk,
the apparatus comprising:
a first record device which records control information in a control information area, and
a second record device which records record information in a recording information area,
wherein the control information comprises rate information for controlling a rotation speed of the disk and disk size information for indicating a size of the disk, and
wherein the rate information and the disk size information is collectively recorded as one byte information.

27. The apparatus of claim 26, wherein the rate information is one of a maximum value of reading rate and the maximum value multiplexed by $(½)^n$ (n: natural number).

28. The apparatus of claim 26, wherein the rate information is one of 10.08 Mbps, 5.04 Mbps and 2.52 Mbps.

29. The apparatus of claim 26, wherein the control information area is in a lead-in area.

30. An information recording method for recording information onto a disk, the method comprising the processes of:
(a) recording control information in a control information area, and
(b) recording record information in a recording information area,
wherein the control information comprises rate information for controlling a rotation speed of the disk and disk size information for indicating a size of the disk, and
wherein the rate information and the disk size information is collectively recorded as one byte information.

31. The method of claim 30, wherein the rate information is one of a maximum value of reading rate and the maximum value multiplexed by $(½)^n$ (n: natural number).

32. The method of claim 30, wherein the rate information is one of 10.08 Mbps, 5.04 Mbps and 2.52 Mbps.

33. The method of claim 30, wherein the control information area is in a lead-in area.

34. An information reproducing apparatus for reproducing record information recorded on a disk comprising a control information area which stores control information, and a recording information area which stores record information, wherein the control information comprises rate information for controlling a rotation speed of the disk and disk size information for indicating a size of the disk, and wherein the rate information and the disk size information is collectively recorded as one byte information,
the apparatus comprising:
a read device which reads the control information and the record information;
a disk drive device which rotates the disk based on the rate information; and
a reproduction device which reproduces the record information.

35. The apparatus of claim 34, wherein the rate information is one of a maximum value of reading rate and the maximum value multiplexed by $(½)^n$ (n: natural number).

36. The apparatus of claim 34, wherein the rate information is one of 10.08 Mbps, 5.04 Mbps and 2.52 Mbps.

37. The apparatus of claim 34, wherein the control information area is in a lead-in area.

38. An information reproducing method for reproducing record information recorded on a disk comprising a control information area which stores control information, and a recording information area which stores record information, wherein the control information comprises rate information for controlling a rotation speed of the disk and disk size information for indicating a size of the disk, wherein the rate information and the disk size information is collectively recorded as one byte information,
the method comprising the processes of:
(a) reading the control information and the record information;
(b) rotating the disk based on the rate information; and
(c) reproducing the record information read.

39. The method of claim 38, wherein the rate information is one of a maximum value of reading rate and the maximum value multiplexed by $(½)^n$ (n: natural number).

40. The method of claim 38, wherein the rate information is one of 10.08 Mbps, 5.04 Mbps and 2.52 Mbps.

41. The method of claim 38, wherein the control information area is in a lead-in area.

* * * * *